United States Patent Office

3,551,517
Patented Dec. 29, 1970

---

3,551,517
ADHESION-PROMOTING EPOXY RESINS
Rostyslaw Dowbenko and Roger M. Christenson, Gibsonia, Pa., assignors to PPG Industries, Inc., Pittsburgh, Pa., a corporation of Pennsylvania
No Drawing. Original application Nov. 16, 1967, Ser. No. 683,474. Divided and this application July 14, 1969, Ser. No. 841,603
Int. Cl. C08g *45/04;* C09d *3/80*
U.S. Cl. 260—834
13 Claims

ABSTRACT OF THE DISCLOSURE

A hydrogenated bisphenol is reacted with an epihalohydrin to form an epoxy resin. The preferred epoxy resin is the reaction product of epichlorohydrin and hydrogenated bisphenol A. These novel epoxy resins are used as adhesion-promoting additives for thermosetting resin coating compositions.

CROSS-REFERENCES TO RELATED APPLICATIONS

This application is a divisional application of U.S. Ser. No. 683,474, filed Nov. 16, 1967, now abandoned.

In United States Pat. No. 2,870,117 it is disclosed that certain thermosetting resin coating compositions attain improved adhesive qualities when an epoxy resin which is a polyglycidyl ether of a phenolic compound is added thereto. The resulting compositions were found to be adherent to many substrates and useful in coating compositions, giving very tough and mar-resistant films which possess excellent chemical resistance.

Although these thermosetting coating compositions have excellent properties, including strong adhesion to a large variety of base materials, the use of epoxy resins of the class contemplated heretofore tends to reduce the exterior durability of the resulting coatings. Hence, the coating industry has been seeking a suitable material which has very little degradation on exposure to atmospheric conditions and still retains the good adhesion-promoting characteristics of the epoxy resins.

It has now been discovered that outstanding coating compositions can be obtained by blending thermosetting resin coating compositions with an epoxide resin reaction product of epihalohydrin and a hydrogenated bisphenol. The resulting coating composition forms films which are outstanding in appearance, gloss, mar-resistance, color retention, moisture-resistance, stain-resistance, grease-resistance, heat-resistance, detergent-resistance, corrosion-resistance, adhesion and flexibility, and have no undesirable odor. This new epoxy resin surprisingly is stable to degradation and yet retains the gross structural similarity to the prior art epoxy resins so that the adhesion-promoting characteristics are retained. The gloss retention of the thermosetting resin coating compositions containing these new epoxy resins is substantially improved.

The novel epoxy resins of this invention are formed by reacting an epihalohydrin with a hydrogenated bisphenol in the presence of an acidic catalyst and subsequently treating the resulting product with an alkaline material.

Any of the epihalohydrins may be used. Examples are 1-chloro-2,3-epoxypropane (epichlorohydrin), 1-bromo-2,3-epoxypropane, and 1-fluoro-2,3-epoxypropane. The preferred epihalohydrin is epichlorohydrin because of its general commercial availability and relatively low cost.

Any hydrogenated bisphenol,

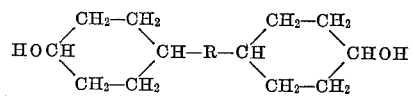

where R is an alkylene group, such as propylene, ethylene, isobutylene, etc., may be used. Some examples are 2,2-bis(4-hydroxycyclohexyl)propane (hydrogenated bisphenol A), 1,1-bis(4-hydroxycyclohexyl)ethane, 1,1-bis (4-hydroxycyclohexyl) - 2 - methylpropane, 2,2-bis(4-hydroxycyclohexyl)butane, and 2,2 - bis(4 - hydroxytertiarybutylcyclohexyl)propane. The hydrogenated bisphenol A is the preferred bisphenol as this is the most commercially available hydrogenated bisphenol.

It is to be understood that the term "hydrogenated bisphenol" as used throughout the specification and claims refers to bisphenols that are essentially completely hydrogenated, as are the above exemplified hydrogenated bisphenols, and refers only to the product. (That is, the compounds may be formed in any manner.)

The reaction may be carried out in solution. Any suitable solvent may be used, such as toluene, methyl isobutyl ketone, and xylene.

An acid catalyst, such as hydrofluoric acid, phosphoric acid, or Lewis acids such as boron trifluoride etherate, boron trifluoride, etc., is utilized in the epihalohydrin reaction with the hydrogenated bisphenol.

The molar ratio of hydrogenated bisphenol to epihalohydrin can be anywhere from about 1:1 to about 1:20. In the preferred embodiment, the molar ratio is from 1:2 to 1:5 moles of hydrogenated bisphenol to moles of epihalohydrin. The amount of acid catalyst used is not critical.

The above reaction can be carried out at between 50° C. and 150° C., and the reaction is generally run from 1 to 7 hours.

After 1 to 7 hours, and while still heating at from 50° C. to 150° C., an alkaline material such as sodium hydroxide is added and the reaction is continued for another 1 to 10 hours. The alkaline material may comprise from 10 to 30 weight percent of the reactants.

The final product will generally have an epoxide equivalent value of from about 200 to 800, a hydroxyl value of about 30 to 200, and a chlorine content of about 2 to 30 percent.

Although these novel epoxy resins give excellent results when used as adhesion-promoting agents, the results are improved if the epoxy resin is partially polymerized. This is because the unpolymerized resins are of fairly low molecular weight and the viscosity is low, and the epoxy may have a tendency to volatilize, particularly over long periods of time. The partial polymerization is carried out by heating the hydrogenated bisphenol epoxy at 50° C. to 150° C. in the presence of a small amount of acidic catalyst. If the epoxy is heated to a high temperature, it will partially polymerize without using an acidic catalyst. The temperature of the partial polymerization reaction is preferably kept at from 150° C. to 200° C. It is desirable to keep the temperature high enough so that the reaction will proceed at a rapid rate and low enough so that the resin will not decomposed.

The acid catalyst can be any acid, such as ammonium fluoborate, phosphoric acid, hydrochloric acid, etc.

The partial polymerization is run for about 1 to 12 hours and the resulting product has increased viscosity and epoxide equivalence greater than 500 and hydroxyl value greater than 30.

In the preferred embodiment of this invention, the hydrogenated bisphenol epoxy, unpolmerized or partially polymerized, is blended with a thermosetting resin to promote the adhesion of said thermosetting resin to various substrates such as metal, wood, glass, etc.

Any thermosetting resin can be blended with the hydrogenated bisphenol epoxy to form the adherent coating compositions of this invention. Examples of some of the thermosetting resins that may be used are given below.

UNSATURATED POLYESTER COMPOSITIONS

Unsaturated polyester resins are well known in the art as a thermosetting resinous material. The unsaturated polyester usually is formed by the esterification of glycols with dicarboxylic acids or acid anhydrides. At least a part of the dicarboxylic acid or acid anhydride contains ethylenic unsaturation, e.g., maleic acid, maleic anhydride, fumaric acid and the like. Some of the dicarboxylic acid or acid anhydride may be free of ethylenic unsaturation, e.g., phthalic acid, isophthalic acid, terephthalic acid, adipic acid, succinic acid, phthalic anhydride and the like. The unsaturated polyester is ordinarily dissolved in a polymerizable monomer, such as styrene, vinyl toluene, acrylates, methacrylates, etc. A typical composition of this type contains about 20 to 50 parts by weight of styrene and 80 to 50 parts by weight of the unsaturated polyester. Such compositions thermoset when heated in the presence of a suitable polymerization catalyst, such as benzoyl peroxide.

ALKYD RESINS

Any of the various alkyd resins used in coatings can be utilized, including resins produced from essentially any polybasic acid and polyfunctional alcohol. For example, the alkyd may be made from such polyfunctional acids as phthalic acid, maleic acid, fumaric acid, isophthalic acid, succinic acid, trimellitic acid, adipic acid, azelaic acid, sebacic acid, linoleic acid, fatty acids and the like, as well as from anhydrides of such acids. The polyfunctional alcohol can be, for example, glycerine, trimethylolethane, trimethylolpropane, pentaerythritol, sorbitol, mannitol, ethylene glycol, diethylene glycol, 2,3-butylene glycol, and similar polyols.

The alkyd resin may be non-oil-modified or modified with a non-drying, semi-drying or drying oil. Coconut oil, tung oil, linseed oil and soybean oil are among those often employed. The alkyd resin can also contain a monobasic acid such as benzoic acid, or it can be a polyester containing adipic acid or a similar acid along with various glycols and/or polyols. An example of a useful alkyd is linseed oil-modified glycol adipate.

The alkyd resin may also be copolymerized with one or more other polymerizable ethylenically unsaturated monomers, such as styrene, acrylic or methacrylic esters, and the like. The most typical of these are styrenated alkyds.

It is noted that alkyd resins are thermoset by the addition of crosslinking agents, such as aminoplasts or phenolic resins.

AMINOPLAST RESINS

Aminoplast resins are produced from the condensation products of amines or amides with an aldehyde. The most common aminoplast resins are urea-formaldehyde and melamine-formaldehyde resins. However, condensation products of other amines and amides can also be employed, for example, those of triazines, diazines, triazoles, guanidines, guanamines, and alkyl and aryl-substituted derivatives of such compounds, including alkyl and aryl-substituted ureas, and alkyl and aryl-substituted melamines, provided at least one amino group is present. Some examples of such compounds are N,N'-dimethylurea, benzoguanamine, 6-methyl - 2,4-diamino-1,3,5-triazine, 3,5-diaminotriazole, triaminopyrimidine, 2,4,6-triphenyltriamino-1,3,5-triazine, and the like. The aldehyde is most often formaldehyde, although similar condensation products can be made from other aldehydes, such as acetaldehyde. In many cases, all or part of the alkylol groups of the condensation product are etherified by reaction with an alcohol to provide organic solvent-soluble materials. Any monohydric alcohol can be employed for this purpose, the preferred alcohols being methanol and butanol. Blends or mixtures of aminoplasts and alkyds are also good thermosetting resins.

PHENOLIC RESINS

Phenolic resins are formed by the condensation of an aldehyde and a phenol. The most used aldehyde is formaldehyde, although other aldehydes, such as acetaldehyde, can also be employed. Methylene-releasing and aldehyde-releasing agents, such as paraformaldehyde and hexamethylenetetramine, can be utilized as the aldehyde agent if desired. Various phenols can be used; for instance, the phenol employed can be phenol per se, a cresol, or a substituted phenol in which a hydrocarbon radical having either a straight chain, a branched chain or a cyclic structure is substituted for a hydrogen in the aromatic ring. Mixtures of phenols are also often employed. Some specific examples of phenols utilized to produce these resins include p-phenylphenol, p-tert-butylphenol, p-tert-amylphenol, cyclopentylphenol and unsaturated hydrocarbon-substituted phenols, such as the monobutenyl phenols containing a butenyl group in ortho, meta or para position, and where the double bond occurs in various positions in the hydrocarbon chain. A common phenolic resin is phenolformaldehyde.

CONJUGATED DIENE POLYMERS

Conjugated diene polymerizates, such as homopolymerized 1,3-butadiene, 2-chlorobutadiene or isoprene, and linear copolymers or terpolymers, such as butadiene-acrylonitrile copolymer, isobutylene-butadiene copolymer, butadiene-styrene copolymer, and 2-chlorobutadiene-vinylidene cyanide-acrylonitrile terpolymers also form thermosetting coating compositions useful in the invention.

DRYING AND SEMI-DRYING OILS

Various highly unsaturated oils, such as linseed oil and tung oil, are film-forming by an oxidative mechanism and can be employed herein. Oils having iodine numbers of at least about 100 are of this type. Bodied, blown and otherwise partially polymerized oils can also be used.

POLYURETHANES

The polyurethanes comprise another class of thermosetting resins that form coatings which have improved durability when blended with the new epoxy resins of this invention. Essentially, the polyurethanes are condensation products of a diisocyanate and a compound having at least two reactive hydrogen atoms, i.e., hydrogen atoms determinable by the Zerewithinoff method. The useful active hydrogen-containing compounds may be polyesters prepared from polycarboxylic acids and polyhydric alcohols, polyhydric polyalkylene ethers having at least two hydroxy groups, polythioether glycols, polyesteramides, etc.

The polyesters or polyesteramides used for the production of the polyurethane may be branched and/or linear, e.g., the esters of adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric itaconic, etc., acids, with polyalcohols, such as ethylene glycol, diethylene glycol, pentaglycol, glycerol, sorbitol, triethanolamine, di-(beta-hydroxyethyl)ether, etc., and/or amino-alcohols such as ethanolamine, 3-aminopropanol, 5-aminopentanol-1, 10-aminodecanol, 6-amino-5-methylhexanol-1, p-hydroxymethylbenzylamine, etc., and with mixtures of the above polyalcohols and amines, ethylenediamine, 3-methylhexamethylenediamine, decamethylenediamine and m-phenylenediamine, etc., and/or amino-alcohols, etc. In the esterification, the acid per se may be used for condensation or, where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene glycol, 2-methylpentanediol-2,4, 2-ethylhexanediol-1,3, hexamethylene glycol, styrene glycol, diethylene glycol, tetraethylene glycol, polythioethylene glycol, polyethylene glycols 200, 400, 600, etc., dipropylene glycol, tripropylene glycol, trithiopropylene glycol, polypropylene glycols 400, 750, 1200, 2000, etc.

Broadly, any of the polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc., having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyanate, ethylidene diisocyanate, propylene-1,2-diisocyanate, cyclohexylene-1,2-diisocyanate, m-phenylene diisocyanate, 2,4-tolylene diisocyanate, 3,3'-dimethoxy-4,4'-biphenylene diisocyanate, 3,3'-dichloro-4,4'-biphenylene diisocyanate, triphenylmethane triisocyanate, 1,5-naphthalene diisocyanate or polyisocyanates in a blocked or inactive form, such as the bisphenyl carbamates of tolylene diisocyanate and 1,5-naphthalene diisocyanate, etc.

FURAN RESINS

Furan resins comprise resinous products obtained from furfural and its derivatives, including furan, tetrahydrofurfuryl alcohol, and furfuryl alcohol. Furfural reacts with phenols to form phenoplasts. Furfuryl alcohol also forms ether linkages readily with other active hydroxyl groups to give useful thermosetting resins. The furfuryl alcohol can also be reacted with formaldehyde, ketones and methyl ketone to form thermosetting coating compositions.

THERMOSETTING ACRYLICS

There are three types of thermosetting acrylics that are becoming increasingly important. One class is interpolymers of an unsaturated carboxylic acid amide with at least one other monomer having a $CH_2=C<$ group, said interpolymer being characterized by having amido hydrogen atoms replaced by the structure $-RCHOR_1$, wherein R is selected from the group consisting of hydrogen and saturated lower aliphatic hydrocarbon radicals and $R_1$ is a member of the class consisting of hydrogen and lower alkyl radicals, such as those disclosed in U.S. Pats. Nos. 2,870,117, 2,978,434, 3,035,965 and 3,079,434. Another class is interpolymers of a hydroxy-alkyl ester of an ethylenically unsaturated carboxylic acid and at least one other ethylenically unsaturated monomer copolymerizable therewith, such as are described in U.S. Pats. Nos. 2,681,897 and 3,084,184. A third class comprises crosslinking carboxyl polymers.

The blend of the new epoxy resins of this invention and the interpolymer of an unsaturated carboxylic acid amide is the preferred embodiment of this invention. In this embodiment, acrylamide or some other polymerizable amide is polymerized with one or more ethylenically unsaturated monomeric compounds, and the resulting interpolymer reacted with an aldehyde to form one component of the coating compositions of this invention.

Among the monomers which may be polymerized with acrylamide are included methyl acrylate, ethyl acrylate, isobutyl acrylate, hexyl acrylate, styrene, vinyltoluene, maleate esters such as dibutyl maleate, acidic materials such as acrylic acid, methacrylic acid maleic anhydride, vinyl ethers, vinyl ketones, vinyl pyridines, allyl acetoacetates, glycidyl acrylates, methacrylamide, dimethylbenzyl methacrylate, hydroxy-substituted acrylics, such as hydroxymethyl methacrylate, hydroxyethyl acrylate, and the like. In general, it is preferred that the monomer utilized contain a single $CH_2=C<$ group in terminal position, and an especially preferred group of monomers includes ethyl acrylate, butyl acrylate, methyl acrylate, styrene, vinyl toluene, acrylic acid, and monomethyl styrene.

It has been found that preferred unsaturated carboxylic acid amide interpolymers are obtained when at least two monomeric compounds are interpolymerized with the acrylamide. In this manner, it is possible to tailor the interpolymer to have any desired degree of hardness or flexibility. For example, one useful ternary interpolymer is prepared from acrylamide, ethyl acrylate and styrene. Also, a small amount of methyl methacrylate tends to improve the hardness of two component interpolymers where one of the monomers is of the type which forms soft homopolymers, and a small quantity of an acid monomer, such as acrylic acid, methacrylic acid, crotonic acid, maleic acid or fumaric acid, has been found to be particularly useful as an internal catalyst in that it imparts to the coating composition desirable fast curing properties. In place of acrylamide, any other polymerizable amide, for example, methacrylamide or itaconic diamide may be utilized.

In another preferred embodiment of this invention, the new epoxy resin is blended with the second important class of thermosetting acrylic resins comprising the hydroxyalkyl ester of an ethylenically unsaturated carboxylic acid. Any crosslinking agent can be used, such as aminoplast resins, etc.

Preferred polymerizations of the class described are those containing hydroxyalkyl esters in which the alkyl group has up to about 12 carbon atoms. Especially preferred esters are acrylic acid and methacrylic acid esters of ethylene glycol and 1,2-propylene glycol, i.e., hydroxyethyl acrylate and methacrylate, and hydroxypropyl acrylate and methacrylate. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

In addition to esters of unsaturated monocarboxylic acids, there may be employed the mono- or diesters of unsaturated dicarboxylic acids, such as maleic acid, fumaric acid and itaconic acid, in which at least one of the esterifying groups is hydroxyalkyl. Such esters include bis(hydroxyalkyl) esters, as well as various other alkylene glycol esters of such acids, and mixed alkyl hydroxyalkyl esters, such as butyl hydroxyethyl maleate and benzyl hydroxypropyl maleate. The corresponding monoesters, such as the mono(hydroxyethyl), mono(hydroxypropyl), and similar alkylene glycol monoesters of maleic acid and similar acids, can also be used, and for some purposes are preferred.

The monomer or monomers with which the hydroxyalkyl ester is interpolymerized can be any ethylenic compound copolymerizable with the ester, the polymerization taking place through the ethylenically unsaturated linkages. These include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. Examples of such monomers include styrene, butadiene-1,3, 2-chlorobutene, alphamethyl styrene, alphachlorostyrene, 2-chlorobutadiene, 1,3, 1,1-dichloroethylene, vinyl butyrate, vinyl acetate, allyl chloride, dimethyl maleate, divinyl benzene, diallyl itaconate, triallyl cyanurate, and the like.

The third important class of thermosetting acrylics that may be blended with the hydrogenated bisphenol epoxies comprises the crosslinking carboxyl-containing polymers. The thermosetting carboxyl polymers that may be used here consist generally of acrylic resins or modified acrylic resins containing from 5 to 40 percent by weight of ethylenically unsaturated acid which is crosslinked with a compound containing functional groups such as epoxies, polyols, amines and melamines. It is noted that the carboxyls may be cured by the blending of the uncured carboxyl polymers with the hydrogenated bisphenol epoxy of this invention.

Acrylic resins which may be used are acrylates, such as ethyl acrylate, butyl acrylate, hexyl acrylate; methacrylates, such as methyl methacrylate, isopropyl methacrylate, hexyl methacrylate; maleate esters such as dibutyl maleate; and fumarates, such as ethyl fumarate; and others.

The ethylenically unsaturated acids which may be used are those such as acrylic acid, methacrylic acid, fumaric acid, maleic acid, itaconic acid, and others.

The carboxyls are crosslinked by the addition of compounds containing functional groups such as polyols, amines, melamine-formaldehyde and epoxy resins.

Thermosetting silicones and cumarone-indene resins are but two of the many other thermosetting resins that may be used here.

It is to be noted that the above examples are by no means inclusive of all the thermosetting resins that may be used in this invention. Any thermosetting coating composition capable of forming a film coating on a substrate may be blended with the novel epoxy resin of this invention to improve the adherence of that film to the base without deleteriously affecting the durability of the coating.

The quantity of the hydrogenated bisphenol epoxy resin which is blended with the thermosetting resin to form the resinous portion of the coating composition of this invention may be varied considerably. For example, amounts as low as about 2 percent by weight give enhanced properties to the coating compositions and amounts as high as 50 percent of the epoxy resin may be employed. Preferably, the new epoxy resin is utilized in an amount of about 5 percent to about 10 percent.

No special expedients are necessary in formulating the blended resins of this invention. For example, they may be prepared simply by admixing a solution of the thermosetting resin with a solution of the epoxy resin. No heating is required as the components may be blended readily in the cold state. The solvents used are likewise not critical and any solvent or solvents which will dissolve the thermosetting resin and the hydrogenated bisphenol epoxy may be employed. Typical solvents that are used are xylol, butanol, and methyl isobutyl ketone. Useful compositions within the scope of the invention can also be obtained by heating or otherwise reacting the epoxy resin and the thermosetting resin together and dissolving the resulting product in a suitable solvent system. The epoxy resin may also be added at the same time the thermosetting resin is being prepared.

Pigments such as titanium dioxide, carbon black and the like may be added to the coating composition to form any desired color. Other ingredients normally found in coating compositions, such as germicides, fillers, driers, silicones and the like, may also be added.

When an internal catalyst such as acrylic acid, methacrylic acid or the like is present in the thermosetting resin, no additional catalyst may be needed to promote the cure of the films obtained from coating compositions disclosed herein. However, in the event the thermosetting resin does not contain an internal catalyst, it is often desirable to add an acidic material shortly before the composition is to be used. Suitable catalysts for this purpose include citric acid, tartaric acid, phosphoric acid, as well as latent catalysts, that is, materials which decompose into acidic materials when heated. Suitable cures may also be obtained in the absence of any catalyst, although slightly higher temperatures and/or baking times may be necessary when the catalyst is not present.

The blends of the thermosetting resin compositions and the hydrogenated bisphenol epoxies are used most extensively for protective coatings. These coatings can be used to protect any base, for example, metal, wood, glass, etc. A particularly difficult adhesion problem is encountered in coating a metal base with many thermosetting resins. The blending of these resins with the hydrogenated bisphenol epoxy resin promotes the adherence of the thermosetting resin to the metal base without appreciably affecting the durability of the coating composition.

The present invention is more particularly described in the following examples which are intended as illustrative only since numerous modifications and variations therein will be apparent to those skilled in the art. It is to be understood that unless otherwise indicated, all percentages are by weight and are based upon nonvolatile solids content.

Examples 1–6

These examples illustrate the preparation of the novel hydrogenated bisphenol epoxy resins to be used as adhesion promoters in thermosetting resin compositions.

In Example 1, a reaction vessel was charged with 960 parts (4.0 moles) of hydrogenated Bisphenol A and 570 parts of toluene and the mixture was heated to 75° C. To the mixture there was added 3.6 parts of boron trifluoride etherate and 74 parts (0.8 mole) of epichlorohydrin. An exothermic reaction set in and 666 parts (7.2 moles) of epichlorohydrin was added dropwise over a period of one hour. The temperature was maintained at 75° C. The mixture was then heated for two hours at 100° C. Six hundred forty (640) parts of a 50 percent sodium hydroxide solution in water was then added. The mixture was heated at 100° C. for an additional four hours. The resulting epoxy resin had an OH value of 191, had 5.2 percent chlorine, and had an epoxide equivalent of 294.

The following table illustrates the properties obtained by varying molar ratios of hydrogenated Bisphenol A to epichlorohydrin and using different solvents and no solvents in the above method of preparing the epoxy resin.

TABLE I

| Example | Moles of hydrogenated Bisphenol A/ moles of epichlorohydrin | Solvent in first step | Final product | | |
| --- | --- | --- | --- | --- | --- |
| | | | Percent chlorine | OH value | Epoxide equivalence |
| 2 | 1:2.2 | | 6.16 | 81 | 288 |
| 3 | 2:8 | | 11.3 | 71 | 368 |
| 4 | 4:8 | t-Butanol | 2.6 | 267 | 382 |
| 5 | 1:10 | Toluene | 24.4 | 48 | 762 |
| 6 | 5:10 | do | 5.7 | 314 | 374 |

Examples 7–9

These examples illustrate the partial polymerization of the hydrogenated bisphenol epoxy resins to be used as adhesion promoters for thermosetting resin coating compositions.

In Example 7, a reaction vessel was charged with 2,200 parts of the epoxy resin produced in Example 6, and 2 parts of ammonium fluoborate. The mixture was heated at 175° C. and stirred for eight hours while collecting the volatile materials in a water trap.

After dilution with solvent, the resulting resin solution had a viscosity of A at 45.5 percent solids, an OH value of 46.0 and epoxide equivalence of 954.

The following table illustrates the partial polymerization products of the epoxy resins of Examples 1 and 4 at a temperature of 175° C.

TABLE II

| Example | Source of epoxy resin | Duration (hours) of polymerization | Final product | | |
|---|---|---|---|---|---|
| | | | Percent solids | OH value | Epoxide equivalence |
| 8 | Example 1 | 2 | 100 | 103 | 578 |
| 9 | Example 4 | 8 | 53.9 | 109 | 1,783 |

Examples 10-22

Blends of unpolymerized and partially polymerized hydrogenated bisphenol epoxy resins and interpolymers of an acrylamide with at least one other monomer having a $CH_2=C<$ group, said interpolymer being characterized by having amido hydrogen atoms replaced by the structure —$RCHOR_1$, wherein R is selected from the group consisting of hydrogen and saturated lower aliphatic hydrocarbon radicals, and $R_1$ is a member of the class consisting of hydrogen and lower alkyl radicals, were prepared by merely mixing the resins at room temperature. These blends were coated onto metal substrates and tested for adhesion and gloss retention. Comparisons were made between the coatings of Examples 10 to 22, which contain the novel epoxy resin modifiers of this invention, and the control coatings without an epoxy resin adhesion promoter and control coatings with conventional epoxy resins as adhesion-promoting additives. These results are tabulated in the table below.

methyl methacrylate, 12 percent butyl methacrylate, 4 percent hydroxyethyl methacrylate, 4 percent hydroxypropyl methacrylate, and 2 percent methacrylic acid was crosslinked with 25 percent butylated melamine-formaldehyde resin and coated on a steel panel and baked at 250° F. for 30 minutes. The crosshatch adhesion test on this coating was compared to that of a coating of the same composition crosslinked with 25 percent butylated melamine-formaldehyde resin and blended with 5 percent by weight of the epoxy resin prepared in Example 7. The tests showed considerable improvement of the adhesion of the resin blended with the epoxy resin over the adhesion of the resin coating without the epoxy resin.

Example 24

A thermosetting carboxyl polymer consisting of 59 percent ethyl acrylate, 30 percent styrene and 11 percent methacrylic acid which has a solids content of 48.9 percent in a solution of 75 percent xylene and 25 percent butyl cellosolve was mixed together with a hydrogenated bisphenol epoxy of this invention and tested for adhesion to a metal panel.

Eighty parts of the carboxyl polymer was added to 20 parts of the partially polymerized hydrogenated bisphenol epoxy of Example 7 and one part of the solution containing 15 percent diethylaminopropylamine and 85

TABLE III

| | Source of epoxy resin used in the blend [1] | Percent epoxy resin in thermosetting coating resin | Thermosetting resin used in blend | Adhesion [4] | 80 inch-lbs. impact test [5] | 40 inch-lbs. impact test [6] | Percent gloss retention after 12 months in Florida [7] |
|---|---|---|---|---|---|---|---|
| Control A | None | 0 | A [2] | 10 | 10 | 7 | 70 |
| Control B | Epon 1001 [8] | 5 | A [2] | 7 | 2 | 5 | 51 |
| Example 10 | 3 | 5 | A [2] | 7 | 7 | | |
| Example 11 | 1 | 5 | A [2] | 9 | 6 | | |
| Example 12 | 4 | 5 | A [2] | 8 | 5 | | |
| Example 13 | 5 | 5 | A [2] | 9 | 6 | | |
| Example 14 | 9 | 5 | A [2] | 8 | 4 | 5 | 62 |
| Example 15 | 7 | 5 | A [2] | 4 | 3 | 3 | 66 |
| Control C | Epon 1001 | 10 | A [2] | 10 | 0 | 5 | 12 |
| Control D | Epon 828 [9] | 10 | A [2] | 5 | 5 | 3 | 46 |
| Example 16 | 1 | 10 | A [2] | 10 | 7 | 6 | 63 |
| Example 17 | 7 | 10 | A [2] | 10 | 5 | 3 | |
| Control E | Epon 1001 | 10 | B [3] | 3 | | | |
| Control F | Epon 828 | 10 | B [3] | 2 | | | |
| Example 18 | 1 | 10 | B [3] | 5 | | | |
| Example 19 | 4 | 10 | B [3] | 7 | | | |
| Example 20 | 5 | 10 | B [3] | 8 | | | |
| Example 21 | 9 | 10 | B [3] | 0 | | | |
| Example 22 | 7 | 10 | B [3] | 1 | | | |

[1] The numbers describe the source of the epoxy resin used to modify the thermosetting resins and correspond to the epoxy resins prepared in the examples of the corresponding numbers.
[2] A thermosetting resin interpolymer having a composition of 10 percent acrylamide which has been reacted with formaldehyde and butanol, 2.5 percent methacrylic acid, 43.5 percent styrene, and 44 percent ethyl acrylate.
[3] A thermosetting resin interpolymer having a composition of 10 percent acrylamide which has been reacted with formaldehyde and butanol, 42.5 percent butyl acrylate, 25.0 percent styrene, 20.0 percent acrylonitrile, and 2.5 percent methacrylic acid.
[4] Adhesion was determined by the crosshatch adhesion test. The coatings on metal bases were crosshatched and taped, and the tape was subsequently removed and the surface of the tested material inspected. The values are given on a basis of 0 to 10, with 10 indicating complete failure of the coating and 0 indicating perfect adhesion or no effect on the coating by the test.
[5] The adhesion was tested by a Gardner impact test using a force of 80 inch-pounds. The tested material was inspected and assigned scores of 0 to 10, with 10 indicating complete failure of the coating and 0 indicating no defect on the coating due to the test.
[6] The adhesion was tested by a Gardner impact test using a force of 40 inch-pounds. The tested material was inspected and assigned scores of 0 to 10, with 10 indicating complete failure of the coating and 0 indicating no defect on the coating due to the test.
[7] Gloss retention was tested on coated aluminum panels by exposing the panels to weathering conditions for one year in Florida. After one year of horizontal exposure, the weathering properties were tested by the percent gloss retained by the coating.
[8] A conventional epoxy resin condensation product of Bisphenol A and epichlorohydrin with a melting point range of 64° C. to 76° C., hydroxy equivalent of 130, and epoxide equivalence of 450 to 525.
[9] A conventional epoxy resin condensation product of Bisphenol A and epichlorohydrin with an epoxide equivalence of 155 to 195.

As seen by the results obtained, the inclusion of an epoxy resin in the thermosetting resin coating composition significantly increases the adhesion properties of the coating and the inclusion of a hydrogenated Bisphenol A—epichlorohydrin epoxy resin shows considerable improvement in weathering properties over the inclusion of the conventional epoxy resins as shown by the gloss retention.

Example 23

A thermosetting resin composition consisting of 30 percent styrene, 30 percent 2-ethylhexyl acrylate, 18 percent percent xylene and applied to an aluminum panel and baked at 350° F. for 30 minutes. Crosshatch adhesion test showed a vast improvement in adhesion over that of a film of the untreated carboxyl polymer on an aluminum base that has been baked at 350° F. for 30 minutes.

Example 25

A thermosetting resin composition consisting of an alkyd resin comprising 38.7 percent phthalic anhydride, 39 percent trimethylolethane ester of coconut fatty acid, and 23.3 percent trimethylolethane was crosslinked with 25 percent butylated melamine-formaldehyde resin and coated on a steel panel and baked at 250° F. for 30 minutes. A crosshatch adhesion test of this coating was compared to the crosshatch adhesion test of a coating of the same film blended with 5 percent of the epoxy resin prepared in Example 7 and heated at 250° F. for 30 minutes. The adhesion of the latter coating was found to be vastly superior to the adhesion of the coating that was not modified with the epoxy resin.

While there are above described a number of specific embodiments of the present invention, it is obviously possible to produce other embodiments and various equivalent modifications thereof without departing from the spirit of the invention or the scope of the appended claims.

We claim:
1. A heat-hardenable resinous composition comprising:
   (1) from about 2 to about 50 percent by weight of the epoxy reaction product of epihalohydrin and a hydrogenated bisphenol wherein the molar ratio of hydrogenated bisphenol to epihalohydrin is from about 1:1 to about 1:20, and
   (2) a thermosetting acrylic composition selected from the group consisting of interpolymers of crosslinkable hydroxyalkyl esters of an ethylenically unsaturated carboxylic acid with at least one other monomer having a $CH_2=C<$ group, and interpolymers of an unsaturated carboxylic acid amide with at least one other monomer having a $CH_2=C<$ group, and interpolymers of an unsaturated carboxylic acid amide with at least one other monomer having a $CH_2=C<$ group, said interpolymer being characterized by having amido hydrogen atoms replaced by the structure —$RCHOR_1$, wherein R is selected from the group consisting of hydrogen and saturated lower aliphatic hydrocarbon radicals, and $R_1$ is a member of the class consisting of hydrogen and lower alkyl radicals.

2. The resinous composition of claim 1 wherein the composition contains from about 5 to about 10 percent by weight of the epoxy reaction product.

3. The heat-hardenable resinous composition of claim 1 wherein the thermosetting coating composition comprises an interpolymer of a crosslinkable hydroxyalkyl ester of an ethylenically unsaturated carboxylic acid with at least one other monomer having a $CH_2=C<$ group.

4. The heat-hardenable resinous composition of claim 1 wherein the thermosetting coating composition is an interpolymer of an unsaturated carboxylic acid amide with at least one other monomer having a $CH_2=C<$ group, said interpolymer being characterized by having amido hydrogen atoms replaced by the structure

—$RCHOR_1$ wherein R is selected from the group consisting of hydrogen and saturated lower aliphatic hydrocarbon radicals, and $R_1$ is a member of the class consisting of hydrogen and lower alkyl radicals.

5. The resinous composition of claim 4 wherein the composition contains from 5 to 10 percent by weight of the epoxy reaction product.

6. The heat-hardenable resinous composition of claim 4 wherein the interpolymer is a copolymer of styrene and acrylamide which has been reacted with formaldehyde and butanol.

7. The heat-hardenable resinous composition of claim 4 wherein the interpolymer is an interpolymer of styrene, ethyl acrylate, acrylamide which has been reacted with formaldehyde and butanol, and an unsaturated carboxylic acid.

8. That heat-hardenable resinous composition comprising:
   (1) from about 2 to about 50 percent by weight of the reaction product prepared by heating the epoxy reaction product of epihalohydrin and a hydrogenated bisphenol wherein the molar ratio of hydrogenated bisphenol to epihalohydrin is from about 1:1 to about 1:20 in the presence of an acidic catalyst, and
   (2) a thermosetting acrylic composition selected from the group consisting of interpolymers of crosslinkable hydroxyalkyl esters of an ethylenically unsaturated carboxylic acid with at least one other monomer having a $CH_2=C<$ group, and interpolymers of an unsaturated carboxylic acid amide with at least one other monomer having a $CH_2=C<$ group, said interpolymer being characterized by having amido hydrogen atoms replaced by the structure —$RCHOR_1$, wherein R is selected from the group consisting of hydrogen and saturated lower aliphatic hydrocarbon radicals, and $R_1$ is a member of the class consisting or hydrogen and lower alkyl radicals.

9. The heat-hardenable resinous composition of claim 8 wherein the thermosetting caoting composition is an interpolymer of an acrylamide with at least one other monomer having a $CH_2=C<$ group, said interpolymer being characterized by having amido hydrogen atom replaced by the structure —$RCHOR_1$, wherein R is selected from the group consisting of hydrogen and saturated lower aliphatic hydrocarbon radicals, and $R_1$ is a member of the class consisting of hydrogen and lower alkyl radicals.

10. An article having a metallic surface having as a coating thereon a heat-hardened film of the resinous composition of claim 1.

11. An article having a metallic surface having as a coating thereon a heat-hardened film of the resinous composition of claim 2.

12. An article having a metallic surface having as a coating thereon a heat-hardened film of the resinous composition of claim 8.

13. An article having a metallic surface having as a coating thereon a heat-hardened film of the resinous composition of claim 9.

References Cited
UNITED STATES PATENTS

| | | | |
|---|---|---|---|
| 2,870,117 | 1/1959 | Vogel et al. | 260—834 |
| 3,305,527 | 2/1967 | Price | 260—834 |
| 3,399,109 | 8/1968 | Zimmerman et al | 260—22 |
| 3,408,421 | 10/1968 | Kurka | 260—830 |
| 3,457,324 | 7/1969 | Sekmakas | 260—834 |

FOREIGN PATENTS

| | | | |
|---|---|---|---|
| 119,415 | 8/1966 | Czechoslovakia | 260—2 |

HOSEA E. TAYLOR, Primary Examiner

R. W. GRIFFIN, Assistant Examiner

U.S. Cl. X.R.

117—132, 161; 260—21, 22, 32.6, 33.6, 830, 831, 835, 836